UNITED STATES PATENT OFFICE.

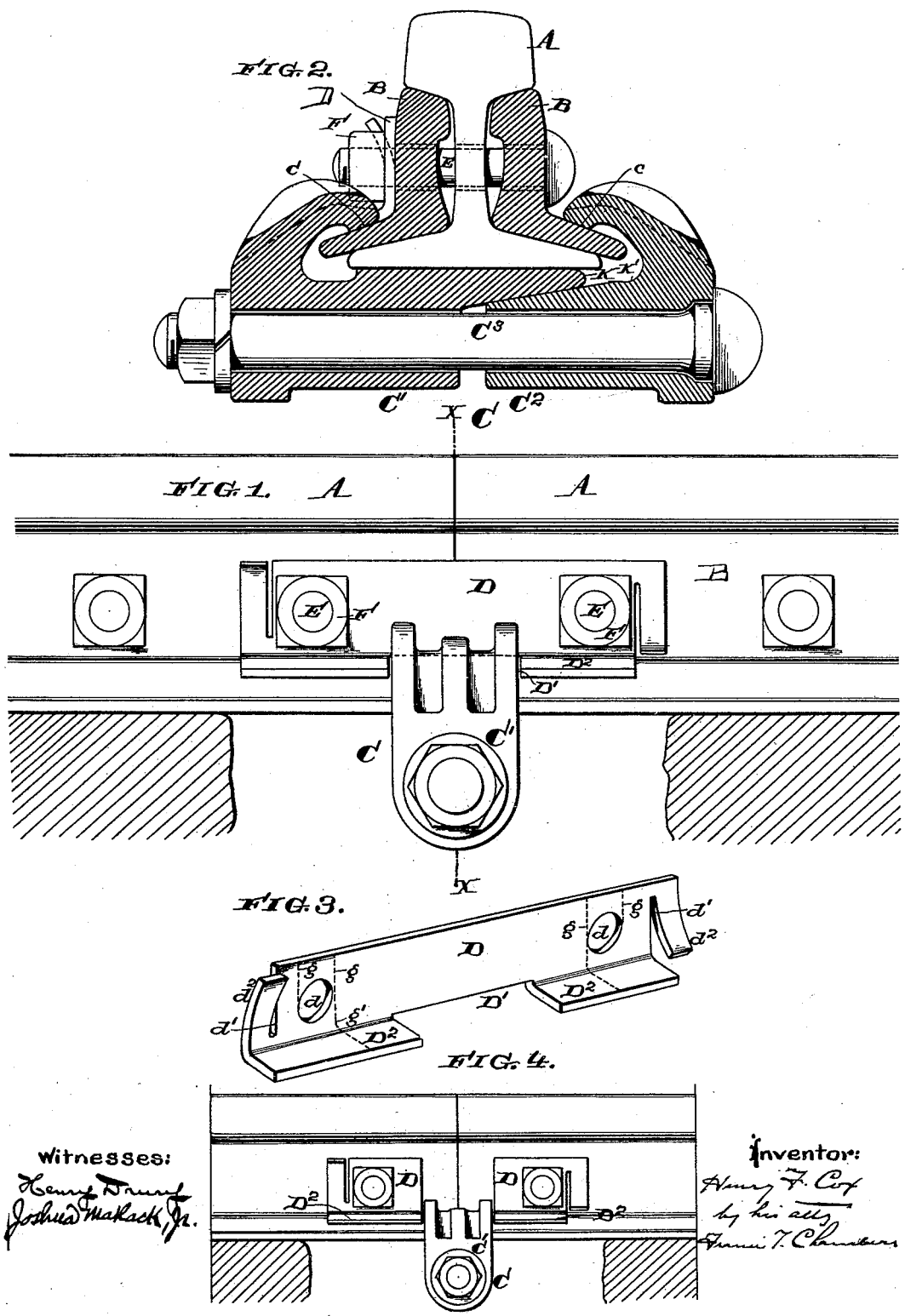

HENRY F. COX, OF ALTOONA, PENNSYLVANIA.

RAIL-JOINT.

SPECIFICATION forming part of Letters Patent No. 439,722, dated November 4, 1890.

Application filed February 26, 1890. Serial No. 341,892. (No model.)

*To all whom it may concern:*

Be it known that I, HENRY F. COX, of Altoona, county of Blair, State of Pennsylvania, have invented a new and useful Improvement in Rail-Joints, of which the following is a true and exact description, reference being had to the accompanying drawings, which form a part of this specification.

My invention relates to those appliances used for maintaining the surface and alignment of railroad-tracks; and the object of this invention is to lock or hold in place upon the rails such clamping devices as are shown and described in Letters Patent Nos. 362,722 and 362,723, granted May 10, 1887, and No. 371,553, granted October 18, 1887.

Hitherto some difficulty has been experienced in preventing the creeping movement of these clamps along the rails, owing to the constant jarring they are subjected to by passing trains. Several methods have been suggested and tried for securing them in place, all of which have been more or less objectionable.

The object of this invention is to provide a simple, cheap, and at the same time effectual means for accomplishing the desired result. I attain this by the device illustrated in the accompanying drawings, in which—

Figure 1 is a side elevation of my invention in place upon the rails; Fig. 2, a vertical section on the line $x$ $x$; Fig. 3, a perspective view, and Fig. 4 a modification of the device as shown in Fig. 1.

Similar letters refer to similar parts throughout the several views.

A A are rails laid in the usual way on sleepers. B is the ordinary form of double-angled fish-plate.

C is a clamp such as is above referred to, consisting of the parts $C'$ $C^2$, having jaws $c$ $c$, and secured together by a bolt $C^3$.

D is my locking device, which consists of a strip of metal bent, as shown, so as to conform to the outward face of the fish-plate or to the face of the fish-plate and top of rail-base where a plain fish-plate is used. The lower central portion of the plate D is cut away, as shown at $D'$, in width sufficient to admit the jaw $c$, while the remaining portions $D^2$ $D^2$ embrace said jaw on both sides and prevent lateral motion in either direction along the rails.

$d$ $d$ are holes cut in the upper portion of the plate to admit the fish-plate bolts E E.

F F are nuts. In order that these nuts may not become unscrewed, I prefer to lock them in place, and this I do by cutting slots $d'$ $d'$ and turning out the metal, as shown at $d^2$ $d^2$, sufficiently near the holes $d$ $d$ that the corners of the nuts in unscrewing will be brought against the edges of the out-bent projections and further movement prevented, while in screwing the nuts on the said projections are sprung automatically backward and forward as the corners come in contact with and pass them, the action being somewhat similar to a spring-pawl and ratchet.

Although I prefer the form above described, my device may also be made as shown in Fig. 4, where instead of a single plate D, as in the other views, two separate plates are used, since the essence of my invention consists in securing the clamp between two abutments formed by the edges of plates of metal or their equivalent held in place on both sides of the clamp by means of the fish-plate bolts, and these plates may obviously be made either in one continuous piece or in separate pieces, as shown. Further, I do not wish to limit myself to securing the locking-plate D, by having the fish-plate bolts pass through holes in it, since any suitable method of fastening it to the said bolts is within the purview of my invention.

Although I consider that by means of the holes $d$ $d$, I have shown the best and simplest way of securing the plate to be attained. U-shaped slots, which are intimated by the dotted lines in Fig. 3, or similar devices might answer the purpose equally well, or the parts of plate D lying outside outside of the lines $g'$, Fig. 3, might be cut away, in which case the bolts E would hold the plate against lateral movement, and the nuts F, overlapping its edges, would clamp it to the fish-plate and secure it in place.

Having now described my invention, what I claim as new, and desire to secure by Letters Patent, is—

1. As a device for locking rail-clamps in place, the combination, with a fish-plate and its bolts, of a rail-clamp and a plate secured in its upper portion to the fish-plate bolts, the lower portion having a flange lying along the fish-plate, and engaged with the jaw of the clamp, substantially as and for the purpose specified.

2. As a device for locking rail-clamps in place, the combination, with a fish-plate and its bolts, of a rail-clamp and a plate fastened in its upper portion to the fish-plate bolts and having nut-locking projections or tongues for securing the bolt-nuts, the lower portion of the plate being provided with a flange lying along the fish-plate and engaged with the jaw of the clamp, substantially as and for the purpose specified.

HENRY F. COX.

Witnesses:
T. B. PROSSER,
JAMES J. KERR.